United States Patent [19]

Kayalioglu et al.

[11] 4,266,099
[45] May 5, 1981

[54] PULSE REJECTION AND DURATION CORRECTION CIRCUIT

[75] Inventors: Inanc Kayalioglu, Ottawa; Vincent G. Roman, Stittsville; Ted J. Lewandowski, Arnprior, all of Canada

[73] Assignee: Northern Telecom Limited, Montreal, Canada

[21] Appl. No.: 43,348

[22] Filed: May 29, 1979

[51] Int. Cl.³ .......................... H04M 1/74; H03K 5/13
[52] U.S. Cl. ................................. 179/16 EA; 179/1 P; 328/164; 328/165
[58] Field of Search ................ 179/1 P, 16 E, 16 EA; 307/232, 234, 265, 358; 328/164, 165

[56] References Cited
U.S. PATENT DOCUMENTS

| | | | |
|---|---|---|---|
| 3,822,385 | 7/1974 | Kayalioglu | 307/234 |
| 3,889,197 | 6/1975 | Duff | 307/234 |
| 4,071,781 | 1/1978 | Kayalioglu | 307/265 |
| 4,086,538 | 4/1978 | Foreman | 307/234 |
| 4,153,848 | 5/1979 | Miyazaki | 328/164 |

Primary Examiner—Bernard Konick
Assistant Examiner—Randall P. Myers
Attorney, Agent, or Firm—J. E. Mowle

[57] ABSTRACT

A circuit which is particularly adapted for reconstructing fixed time duration dialing pulses in a telephone communications system while rejecting spurious pulses of less than a selected pulse duration. The circuit utilizes two coupling networks having integrated outputs of opposite polarity which are summed after passing through two separate switching amplifiers. The summed outputs are fed through a third switching amplifier having a hysteresis characteristic so that it switches only when both outputs have switched to the same polarity.

3 Claims, 6 Drawing Figures 4,266,099

PULSE REJECTION AND DURATION CORRECTION CIRCUIT

This invention relates to a circuit for rejecting pulses of less than a preselected time duration and more particularly to one which may also provide output pulses of a fixed time duration for those input pulses which are not rejected.

BACKGROUND OF THE INVENTION

In telephone communications involving d-c pulse signalling, it is known to provide pulse rejection circuitry which prevents unwanted spikes or disturbances on the line from erroneously being accepted as dial pulses. An example of such a circuit is shown in applicants' U.S. Pat. No. 3,822,385 entitled "Pulse Rejection Circuit" issued July 2, 1974 and invented by Inanc Kayalioglu.

In addition, pulse duration correction circuits which are responsive to incoming dial pulses, are also utilized to provide output pulses of a standardized or fixed time duration. Such a circuit is shown in U.S. Pat. No. 4,071,781 entitled "Pulse Duration Correction Circuit" issued Jan. 31, 1978, also invented by Inanc Kayalioglu.

In some applications it may be advantageous to exercise independent control over the delay intervals and the threshold levels for both the positive and negative going portions of these pulse signals, particularly when the make-break interval of the pulses is asymmetrical as is normally the case with dial pulses.

STATEMENT OF THE INVENTION

It has been found that these advantages may be obtained in an improved pulse rejection circuit which is realized by utilizing two switching amplifiers each of which is coupled to the input of the circuit by separate coupling networks which provide independent integrated outputs for signals of opposite polarity. The summed output of the two amplifiers is coupled to a third switching amplifier which has a switching hysteresis so that its output is only switched whenever the two outputs of the other amplifiers have the same polarity.

By utilizing operational amplifiers each having a pair of inputs which are inverted with respect to each other, for the switching amplifiers, and coupling an integrated input signal to each of the second inputs, the circuit also provides pulse duration correction so that only input signals of greater than a preselected time duration produce an output signal which itself is of a constant time duration regardless of the duration of the input signal.

BRIEF DESCRIPTION OF THE DRAWINGS

Example embodiments of the invention will now be described with reference to the accompanying drawings in which.

DESCRIPTION OF THE PREFERRED EMBODIMENT

Figure 1:
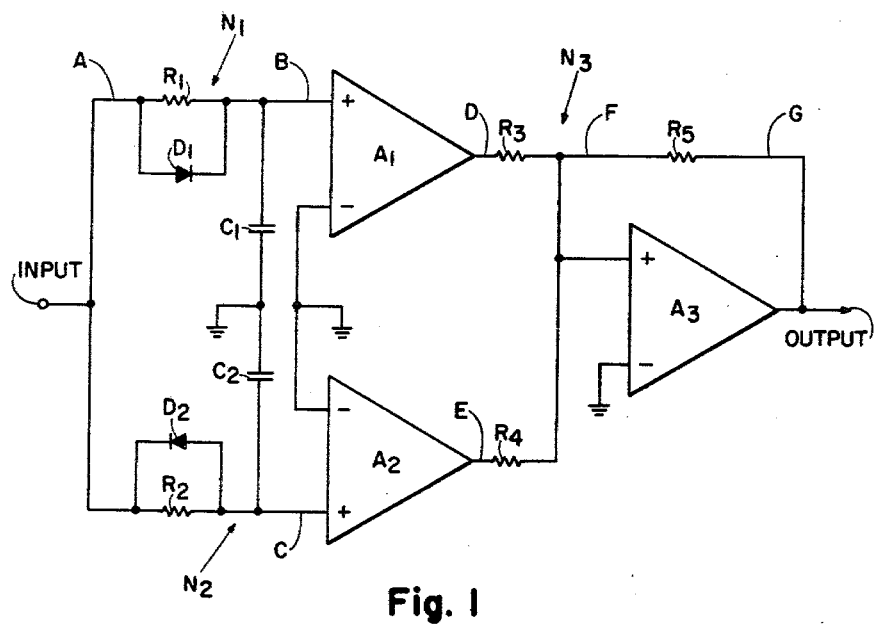
FIG. 1 is a schematic circuit diagram of a pulse rejection circuit.

In both the preferred embodiments, corresponding components will have the same reference characters where their function is the same even though the circuit configuration is slightly altered. In addition, the location of the various waveforms in FIGS. 1 and 2 will be identified by corresponding reference characters in FIGS. 3 to 6. The description of the preferred embodiments will now be described in conjunction with the operation.

Figure 3:
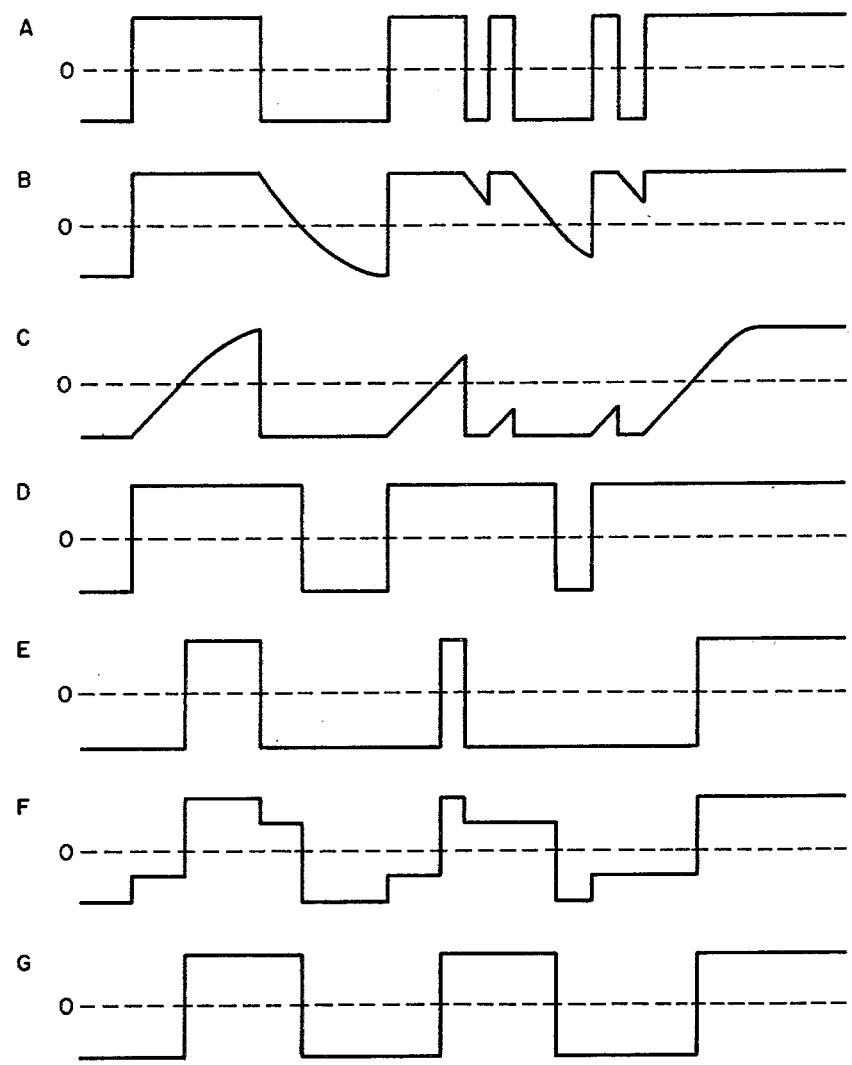
FIG. 3 A-G illustrates typical voltage waveforms at various points of the pulse rejection circuit illustrated in FIG. 1.

Referring to the pulse rejection circuit of FIG. 1 and the waveform of FIG. 3, pulse signals A of varying length are connected from the input through the coupling networks $N_1$ and $N_2$ to the respective non-inverting inputs of the operational amplifiers $A_1$ and $A_2$. The network $N_1$ which includes resistor $R_1$, capacitor $C_1$, and diode $D_1$, provides direct coupling through the diode $D_1$ for positive-going signals but an integrated output for negative-going signals as shown in B. Similarly, the network $N_2$ provides direct coupling through the diode $D_2$ for negative-going signals and an integrated output developed across capacitor $C_2$ in conjunction with resistor $R_2$ for positive-going signals as shown at C. With the inverting inputs of the amplifiers $A_1$ and $A_2$ tied to a common reference point or ground, the square-wave outputs D and E are positive whenever their respective inputs B and C are also positive. The outputs D and E are coupled through a summing network $N_3$ including resistors $R_3$ and $R_4$, to the non-inverting input of a third operational amplifier $A_3$ whose inverting input is also tied to ground.

Positive feedback around amplifier $A_3$ is controlled by resistor $R_5$ in conjunction with resistors $R_3$ and $R_4$ so as to provide a switching hysteresis whereby the output G is switched only when the outputs D and E have both switched and are of the same polarity as shown in F. Thus, each of the amplifiers $A_1$, $A_2$ and $A_3$ functions as a switching amplifier so as to effectively reject pulses of less than a preselected pulse duration, while passing all pulses of a longer duration.

Each of the operational amplifiers $A_1$, $A_2$ and $A_3$, is assumed to have a very high input impedance and low output impedance relative to the other components in the circuit. As can be seen from waveforms B and D, the output of the amplifier $A_1$ will go positive immediately for a positive-going input but will go negative only after a time delay determined by the time constant $\tau_1 = R_1 \cdot C_1$, for negative-going signals. Similarly, referring to waveforms C and E, the output will go negative immediately for negative-going input signals but will go positive only after a time delay determined by the time constant $\tau_2 = R_2 \cdot C_2$.

The resistors $R_3$, $R_4$ and $R_5$, form a summing network $N_3$ at the input to the amplifier $A_3$. This network $N_3$ pre-biases the input of the amplifier $A_3$ depending upon the existing state of its output. This pre-bias is such that the outputs from amplifiers $A_1$ and $A_2$ must both change state in the same direction before the pre-bias on amplifier $A_3$ is exceeded and its output changes state. Because of this action, the output of the pulse rejection circuit will not change state until both signals D and E have changed polarity.

Figure 2:
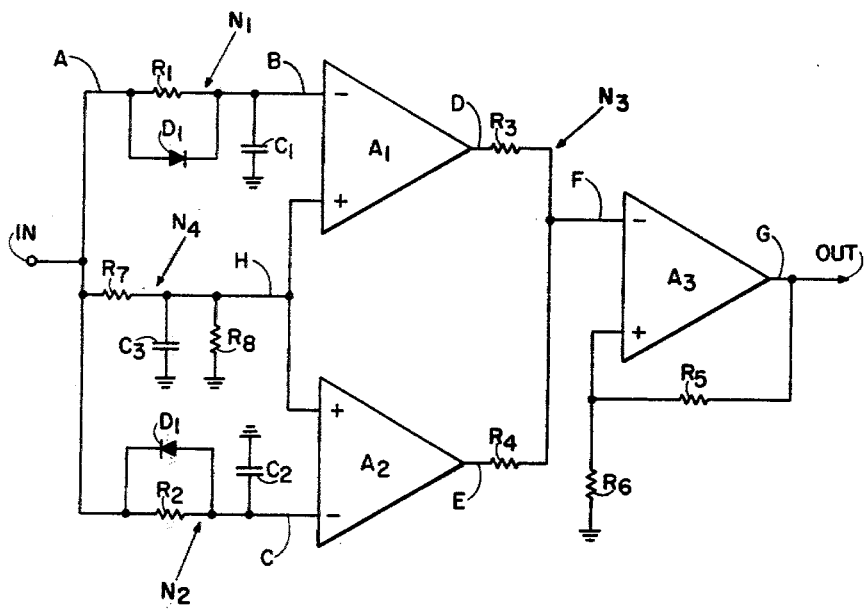
FIG. 2 is a variation of the embodiment illustrated in FIG. 1 which additionally provides pulse duration correction.
Figure 4:
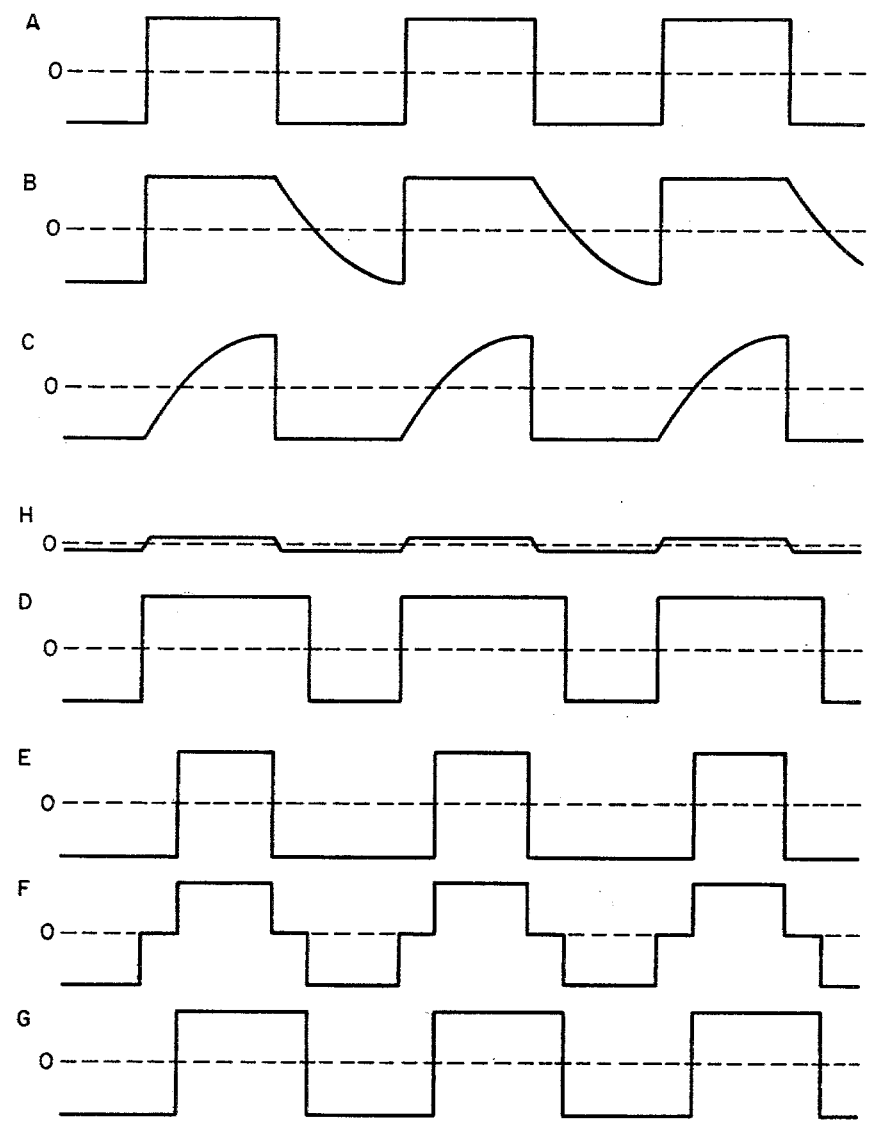
FIGS. 4-6, A-G, additionally illustrate typical voltage waveforms at various points of the circuit illustrated in FIG. 2, for incoming signals which are symmetrical pulses, short negative pulses, and short positive pulses respectively.
Figure 5:
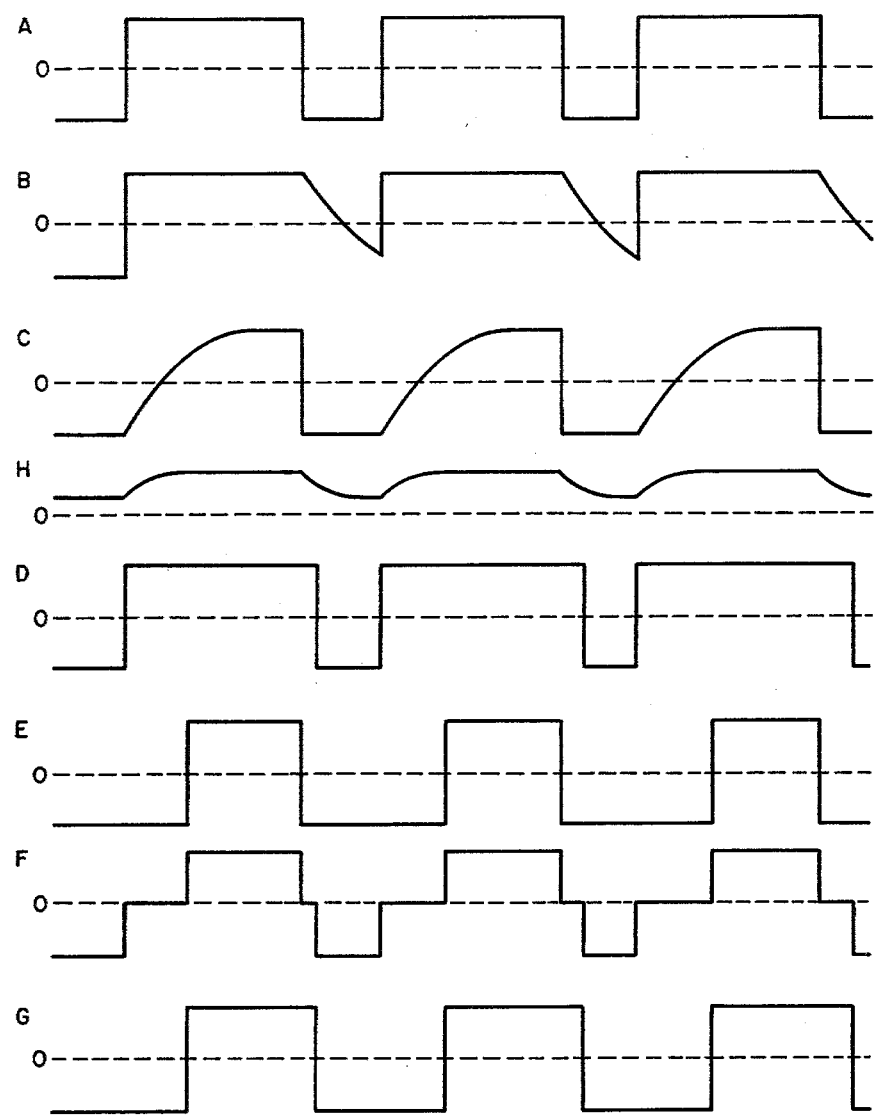
Figure 6:
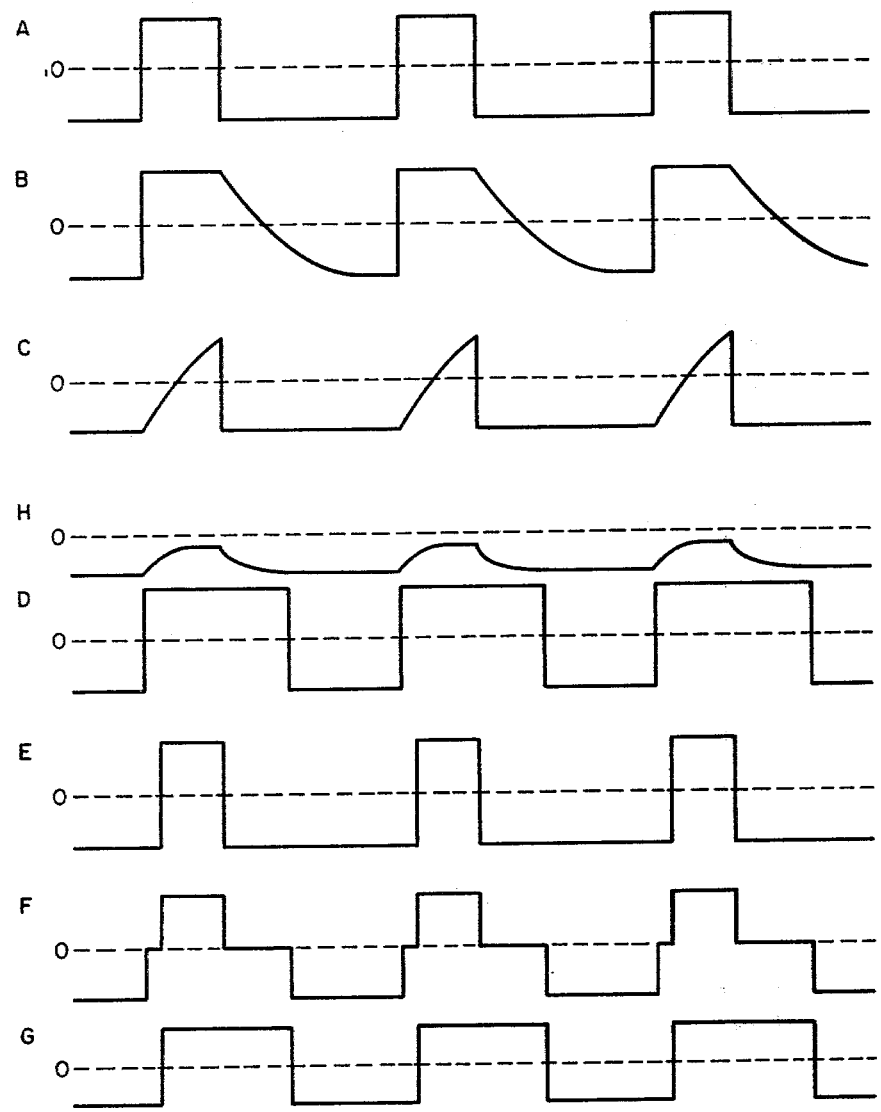

Referring to the embodiment illustrated in FIG. 2 and the waveforms of FIGS. 4, 5 and 6, an additional integrating network $N_4$ including resistors $R_7$, $R_8$ and capacitor $C_3$, is coupled from the input to the second inputs of the operational amplifiers $A_1$ and $A_2$. This circuit in conjunction with the balance of the circuit provides both pulse rejection and pulse duration correction at the output. In this optional embodiment, the inverting and non-inverting inputs of the amplifiers $A_1$, $A_2$ and $A_3$, have been reversed relative to those shown in FIG. 1. However, the basic operation with respect to pulse rejection remains the same. Since the resistor $R_5$ is no longer connected to resistors $R_3$ and $R_4$, an additional resistor $R_6$ is required to provide the pre-biasing of the amplifier $A_3$.

FIG. 4 illustrates a typical case when a symmetrical pulse signal A is coupled to the input of the circuit. It can be seen that a symmetrical pulse train is passed undistorted because the reference voltage H which controls the switching of the amplifiers $A_1$ and $A_2$, remains approximately at ground potential. However, as illustrated in FIGS. 5 and 6, an unsymmetrical pulse train will change the reference signal H in the direction of the longer pulse segment and consequently produce a longer output pulse of the opposite polarity. Thus, the input pulse train A is corrected to an output pulse train of a substantially constant pulse duration. While not specifically illustrated, further flexibility of the circuit can be achieved by coupling different threshold voltages to the second inputs of the amplifiers $A_1$ and $A_2$ (i.e. the inverting inputs of FIG. 1 and the non-inverting inputs of FIG. 2). Also, a capacitor may be connected in shunt with resistor $R_6$ to alter the timing.

In a typical pulse dialling situation, the standard time interval between pulses is 100 ms: comprising 60 ms break and 40 ms make. This can be readily achieved by altering the ratio of the time constants $\tau_1$ and $\tau_2$. By doing this, any dial pulse between about 15 and 80 ms can be readily corrected to one having a 60 ms break while ones outside this range are rejected.

What is claimed is:

1. A pulse rejection circuit comprising:
   a circuit input and a circuit output;
   first, second and third switching amplifiers, each having an input and an output;
   a first coupling network having a direct coupled output for positive polarity signals and an integrated coupled output for negative polarity signals, connected between the input of the circuit and the input of the first amplifier;
   a second coupling network having a direct coupled output for negative polarity signals and and integrated coupled output for positive polarity signals, connected between the input of the circuit and the input of the second amplifier;
   a summing network for connecting the summed outputs of the first and second amplifiers to the input of the third amplifier, the third amplifier having a switching hystersis so that it switches only when both outputs of the first and second amplifiers have switched to the same polarity.

2. A pulse rejection and duration correction circuit comprising:
   a circuit input and a circuit output;
   first and second operational amplifiers each having first and second inputs inverted with respect to each other, and an output;
   a first coupling network having a direct coupled output for positive polarity signals and an integrated coupled output for negative polarity signals, connected between the circuit input and the first input to the first amplifier;
   a second coupling network having a direct coupled output for negative polarity signals and an integrated coupled output for positive polarity signals, connected between the circuit input and the first input to the second amplifier;
   integrating network means connected between the circuit input and each of the second inputs to the first and second amplifiers;
   a summing network for connecting the outputs of the first and second amplifiers to an input of a third operational amplifier, the third operational amplifier including feedback means to provide a switching hystersis, so that the third amplifier switches only when both outputs of the first and second amplifiers have switched to the same polarity.

3. A pulse rejection and duration correction circuit as defined in claim 2 in which each coupling network includes a shunt connected diode and resistor connected in series between the circuit input and the respective first input to the operational amplifier, and a capacitor connected between the respective first input to the operational amplifier and a common reference connection;
   in which the integrating network includes a resistor connected in series between the circuit input and the second inputs to the first and second amplifiers and a shunt connected resistor and capacitor connected between the second inputs and the common reference connections;
   in which the summing network includes separate resistors connected between each output of the first and second operational amplifiers and the input to the third amplifier; and
   in which the third operational amplifier has a positive feedback resistor to provide the switching hystersis.

* * * * *